United States Patent [19]

Yamamoto

[11] Patent Number: 4,888,612
[45] Date of Patent: Dec. 19, 1989

[54] PHOTOGRAPHIC PRINTING SYSTEM
[75] Inventor: Shohei Yamamoto, Tokyo, Japan
[73] Assignee: Fuji Photo Film Co., Ltd., Kanagawa, Japan
[21] Appl. No.: 200,986
[22] Filed: Jun. 1, 1988
[30] Foreign Application Priority Data
  Jun. 5, 1987 [JP] Japan .................................. 62-140902
[51] Int. Cl.$^4$ .............................................. G03B 27/72
[52] U.S. Cl. ........................................ 355/35; 355/68; 355/38
[58] Field of Search ..................... 355/38, 68, 77, 35; 358/76, 8 D

[56] References Cited
U.S. PATENT DOCUMENTS

| | | | |
|---|---|---|---|
| 4,243,215 | 10/1981 | Rosborough, Jr. et al. | 355/77 |
| 4,563,083 | 1/1986 | Shiota | 355/38 |
| 4,704,026 | 11/1987 | Rauh et al. | 355/38 |
| 4,736,244 | 4/1988 | Shiota et al. | 358/80 X |

Primary Examiner—L. T. Hix
Assistant Examiner—D. Rutledge
Attorney, Agent, or Firm—Sughrue, Mion, Zinn, Macpeak & Seas

[57] ABSTRACT

A photographic printing system equipped with an analyzer for displaying on a CRT an image equivalent to that of the print and a plurality of enlargers for performing printing based upon data obtained by means of the analyzer. In the analyzer, the data displayed on the CRT are transduced into printing condition data for each enlarger and stored on a storage medium for each of the enlargers so that an optimum print may be obtained at each of the enlargers. The enlargers select the corresponding printing condition data from the storage medium and perform printing. The data displayed on the CRT are transduced into the printing condition data for each of the enlargers, so that the same print can be obtained even when printing is performed based upon the same data displayed on the CRT using a plurality of enlargers with different exposure systems.

20 Claims, 9 Drawing Sheets

50:PRINTING PAPER

PHOTOGRAPHIC PRINTING SYSTEM

BACKGROUND OF THE INVENTION

1. Field of the Invention

This invention relates to a photographic printing system, and more particularly relates to a photographic printing system for printing blow-ups which require high finishing accuracy.

2. Description of the Related Art

In photo studios where wedding pictures or the like are taken, enlargers of the type in which a focusing check is effected with the naked eye are generally employed (free focus type enlargers). In such photo studios, it is a requisite that blow-ups be prepared and that the subjects be arranged in an optimum manner in predetermined frame sizes. Further, in respect of the finish state of the prints, a higher image quality is required than in the case of taking ordinary snapshots. This is due to the fact that the greater the magnification of a picture, the more liable it becomes to errors in density and color balance. To overcome this, an analyzer is used to obtain correct data (printing condition data) from finished negative films.

Such an analyzer is used to adjust factors such as density and color balance to optimum values by picking up the image on a negative film with a CCD camera and displaying the image thus obtained on a CRT. The image displayed on the CRT is identical with the one to be printed on printing paper and it can be adjusted by the operator. Accordingly, the operator can visually determine, before the printing process, whether an optimum image can be printed on printing paper or not. The data thus adjusted can be supplied to the controller of a particular enlarger by storing it in a storing medium such as a floppy disk, and the printing can be performed at the enlarger in accordance with the data stored in the storing medium.

However, more than one enlarger may be installed in a photo studio; there may be a studio where a plurality of enlargers of different models are installed. When performing printing from the same negative film using these enlargers, based on the data obtained with the analyzer, slight differences may result from one and the same group of data, in density, color balance, etc., due to differences in the type of light source, the printing method (additive color process or subtractive color process), the type of dimmer filter and the finishing accuracy of the lens used. Even when the models are the same, any difference in the channels which are determined in accordance with the type of negative film, the film maker, the film sensitivity, the emulsion number of the printing paper, etc., will result in changed exposure conditions, so that a similar phenomenon may occur.

SUMMARY OF THE INVENTION

In view of the above problems, it is an object of this invention to provide a photographic printing system which makes it possible to perform printing on printing paper with the same finish even if the enlargers used are of different models, or if the same enlargers are used with different channels.

The photographic printing system in accordance with this invention includes an analyzer for storing in a storage medium printing condition data, which is based on image data obtained from a negative film, and an enlarger for performing printing in accordance with the data stored in said storage medium, said analyzer storing said printing condition data in said storage medium after correcting the data in accordance with the specifications of the designated enlarger.

In accordance with this invention, the printing condition data is stored in a storage medium by an analyzer, so that by performing printing with the enlarger in accordance with the data thus stored, the same finish can be obtained even if printing is done on several sheets of printing paper from the same negative film.

Here, the printing condition data may include the magnification, the DSL (density slope) value, the CSL (color slope) value, the exposure time, correction, etc.

Further, the analyzer of this invention corrects data stored in the storage medium in accordance with the specifications of the enlarger and stores the data thus corrected. This makes it possible to obtain the same finish on printing paper even if printing is conducted using any one of the enlargers selected from a plurality of enlargers which have identification serial numbers and different specifications, or following different channels with the same enlargers.

Here, the specifications of an enlarger include the type of enlarger (especially the exposure type) the serial number (production number), the channels, etc.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
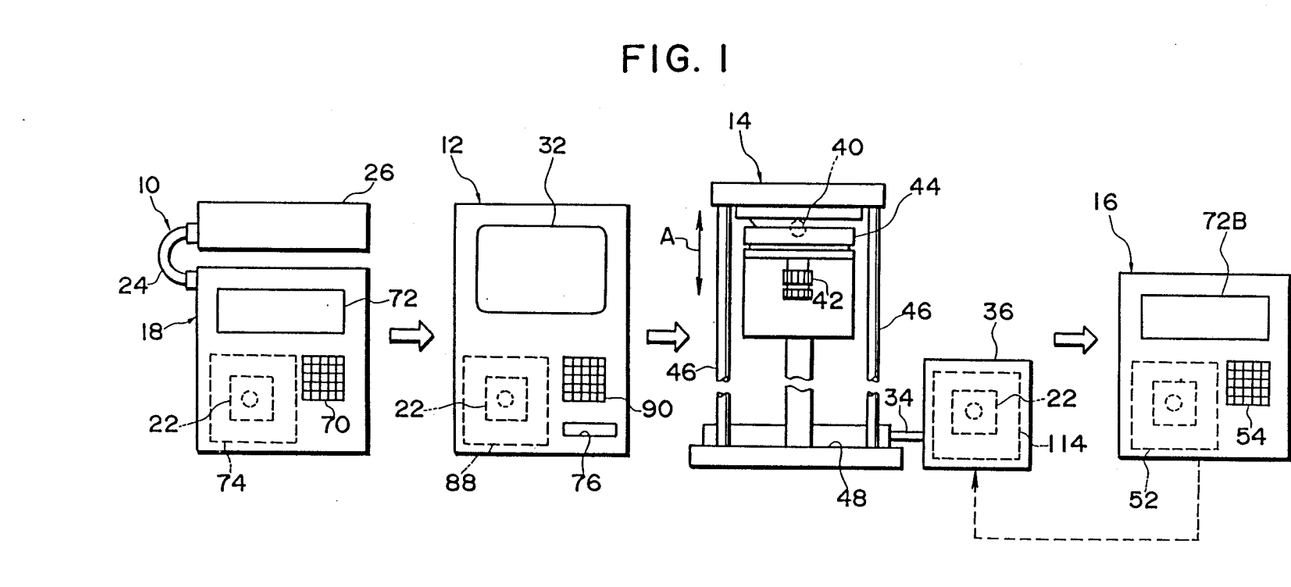
FIG. 1 is a schematic block diagram of the photographic printing system in accordance with this invention.

FIG. 1 shows the constitution of the photographic printing system in accordance with this invention. This photographic printing system is composed of a reception unit 10, analyzer 12, a free focus type enlarger 14 and a tester 16, and is generally used for printing blow-ups (for example, souvenir photographs such as wedding pictures).

A floppy disk 22 is to be inserted in a body 18 of the reception unit 10. A developed negative film 20 is placed in the digitizer 26 which is connected with the body 18 through a connector 24. The image on the negative film is adjusted to coordinate axes in order to determine the dimensions of the image (especially those of a person) to be printed. An optimum magnification matched with the frame (used for holding the print) to be adopted is designated and stored on the floppy disk 22. If the negative film 20 has a frame number or an order number for specifying the image frame, such a number can also be stored. These data are input through a keyboard 70 provided in the body 18. When the loading of the data onto the floppy disk 22 inserted in the disk drive 74 is finished, the floppy disk 22 is taken out to be used later in the analyzer.

In the analyzer 12, the image on the negative film 20 is displayed on a CRT 32 and the file corresponding to the type of the enlarger 14 (Type 1 or Type 2) to be used for printing the photograph stored beforehand on the floppy disk 22 and to the print channel number of that enlarger 14 are read in order to calculate the basic data on the DSL (density slope) value, CBL (color balance) value and CSL (color slope) value matched with the data stored in this file. As for the enlarger types, Type 1 may be, for example, an enlarger needing no magnification correction and Type 2 may be one needing such a correction. Further, the exposure time, color filter value, correction value and magnification correction which are best suited for printing this negative film 20 are also calculated and stored on the floppy disk 22. The calculated data are output through a dot printer not shown. As described above, different data are calculated in this analyzer 12, depending on the type of the enlarger 14 to be used for printing and the print channel number, so that the same finish of the print can be obtained even if printing is performed with a plurality of enlargers of different types.

When all the data necessary for printing have been stored in a particular file of the floppy disk 22 by means of this analyzer 12, this floppy disk 22 is inserted in a disk drive 114 of a controller 36 which is connected to the enlarger 14 through a connector 34. Then, a movable section 44 composed of a light source 40, a lens 42, etc., is guided along a guide member 46, in either of the two directions indicated by the arrow A in FIG. 1, in accordance with the data of the particular file stored on the floppy disk 22, and printing is performed on a printing paper sheet 50, which is set on an easel 48 (see FIG. 4.).

The printed sheet 50 is tested visually by the operator after the predetermined development process. Such a testing should be performed because a souvenir photograph needs a higher finishing accuracy than an ordinary snapshot. When the finish proves to be inadequate, reprinting is to be effected. Correction of said data is then performed by means of the tester 16. The tester 16 is provided with a disk driver 52 in which the floppy disk inserted in the controller 36 can be inserted. It also has a keyboard 52 for rewriting the data on the floppy disk 22. Before printing is completed, at least one test printing is to be performed in addition to the final printing.

The inner constitution of the above-described reception unit 10, analyzer 12, enlarger 14 and tester 16 will now be explained one by one. First, the reception unit 10 will be explained with reference to FIG. 2.

Figure 2:
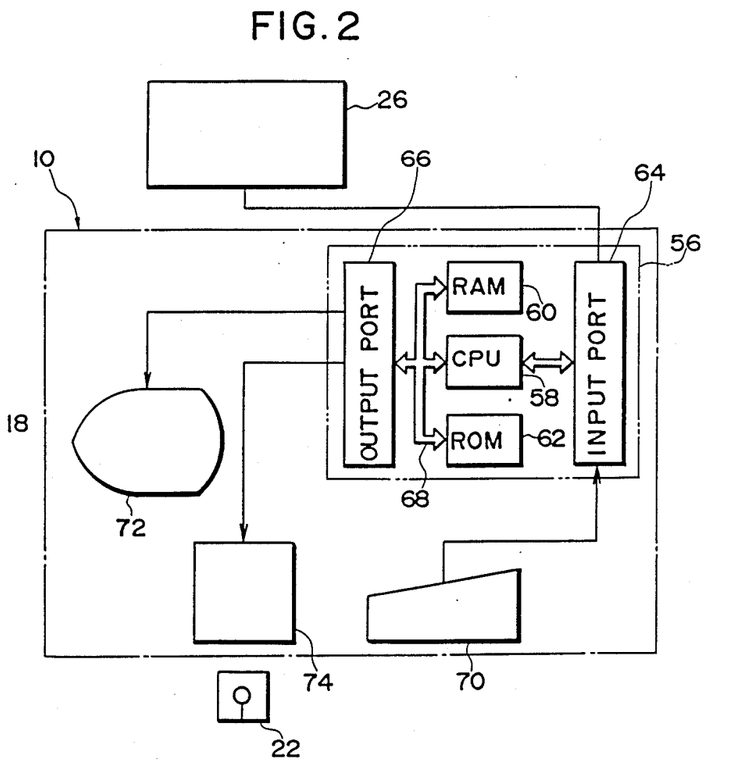
FIG. 2 is a block diagram of the reception unit thereof.

In the body 18 of the reception unit 10 is incorporated a microcomputer 56, which is composed of a CPU 58, a RAM 60, a ROM 62, and input port 64, an output port 66 and control buses 68 such as a data bus and a control bus connecting these components with each other. To the input port 64 are connected a keyboard 70 and a digitizer 26, by means of which the dimensions of the image designated by the operator are detected and input to the microcomputer 56 through key manipulation. The data input through the keyboard 70 is displayed on a liquid crystal display 72 connected to the output port 66. A frame number and an order number allotted to the negative film beforehand are also input through the keyboard 70. These data are stored on the floppy disk 22 inserted in the disk driver 74.

Figure 3:
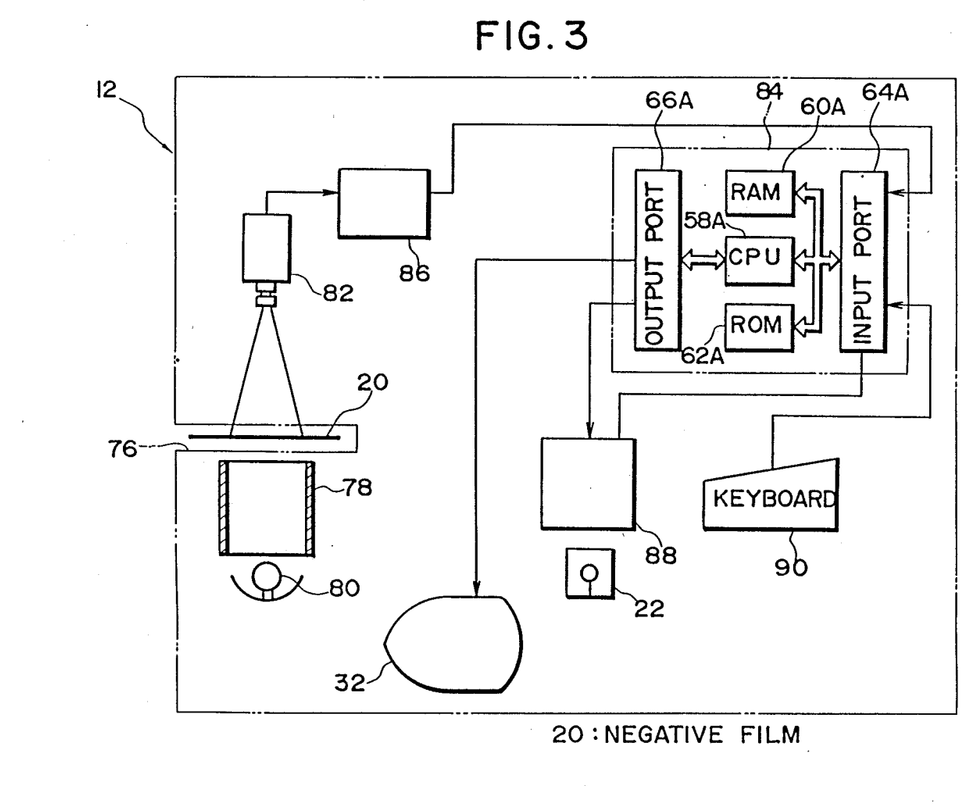
FIG. 3 is a block diagram of the analyzer thereof.

Next, the analyzer will be described with reference to FIG. 3.

Below a negative film loading section 76 of the analyzer 12 is arranged a diffusion cylinder 78 and below the diffusion cylinder 78 is arranged a light source 80. The light beam from the light source 80 is diffused by the diffusion cylinder 78 and then transmitted through the negative film 20. The image thus transmitted is picked up by a CCD camera 82. In other words, the image on the negative film 20 is scanned and divided into a multitude of picture elements, the density, color balance, etc. of each picture element being transduced into electric signals to be supplied to a built-in micro computer 84 of the analyzer 12. Between the CCD camera 82 and the microcomputer 84 is provided a negative-positive reversing circuit 86 to enable the picked-up image to be transduced into one equivalent to what is to be printed on printing paper before being input to the microcompter 84. Since the microcomputer 84 is of the same construction as the microcomputer 56 provided in the body 18 of the reception unit 10, an explanation of it will be omitted here. The components of the microcomputer 84 are allotted reference numbers having an A after the corresponding reference numbers of the microcomputer 56.

To the microcomputer 84 is connected a disk drive 88, in which the floppy disk 22 is inserted for the purpose of enabling the reading and correcting of data. To the input port 64A is connected a keyboard 90, through manipulation of which the file specifying the type of the enlarger 14 and the channel number can be designated. This designation enables the density, color balance, magnification, etc. of the image displayed on the CRT 32 to be corrected. The corrected data is stored in said file for later utilization when printing is performed with the enlarger 14.

When there are a plurality of enlargers 14 and printing is to be performed from the same negative film 20 using those enlargers, the above correction is effected for each enlarger in accordance with the type of enlarger and the file for each enlarger is prepared in the form of a table to be stored on the floppy disk 22.

Figure 4:
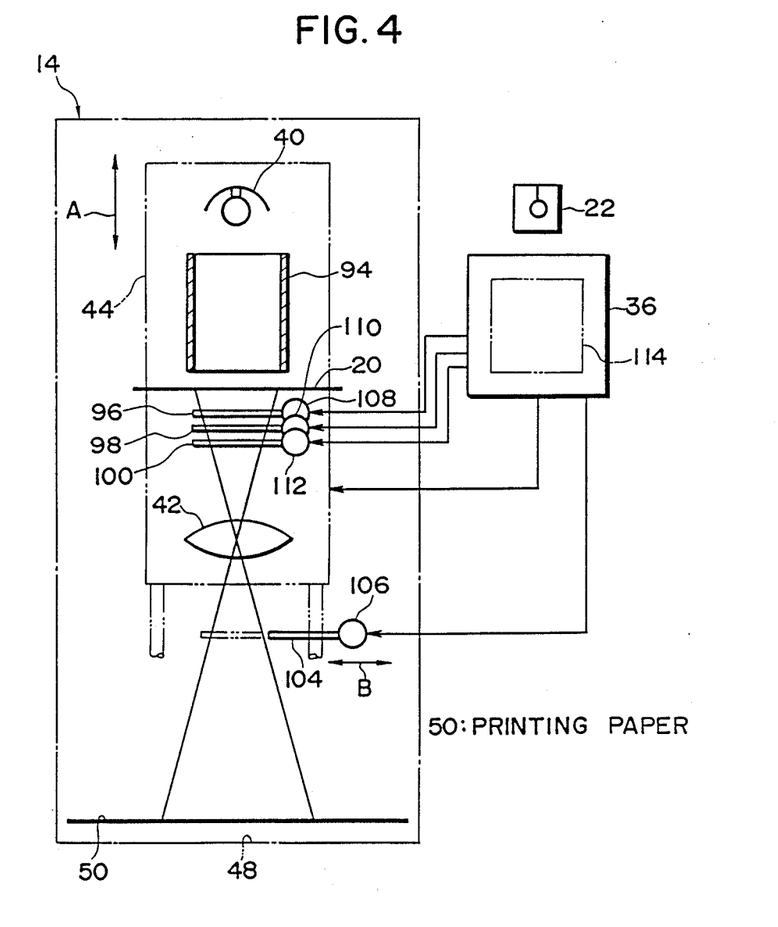
FIG. 4 is a block diagram of the enlarger thereof.

FIG. 4 shows an example of the enlarger 14. Above a movable section 44 is arranged a light source 40 which irradiates the negative film 20 with a light beam through the intermediary of a diffusion cylinder 94. The beam transmitted through the negative film 20 is applied to a printing paper sheet 50 arranged on an easel 48 through the intermediary of dimmer filters 96, 98, 100 for C (cyan), M (magenta), Y (yellow), respectively, as well as a lens 42. The magnification with which printing is effected on the printing paper sheet can be modified by the movement of the movable section 44 along the guide member 46 (FIG. 1), the greater being the magnification, the larger the distance between the movable section 44 and the easel 48. In the light beam path which is applied to the printing paper sheet 50 through the lens 42 is provided a shutter 104 movable in the direction of the arrow B in FIG. 4 by means of a driver 106 upon receiving a signal from said controller 36.

The shutter 104 is moved from the interrupting position indicated by the imaginary line in FIG. 4 (shutter closed) to the position indicated by the full line (shutter open) to allow the beam to pass for a predetermined exposure time so as to perform printing on the printing paper sheet 50, then is returned to the position indicated by the imaginary line. Said dimmer filters 96, 98, 100 are subtractive color filters. They are situated in the beam immediately after opening of the shutter 104 but are removed, after a predetermined period of time, from the beam successively through respective drivers 108, 110, 112, actuated by a signal from the controller 36.

The controller 36 includes a built-in disk drive 114 in which said floppy disk 22 is inserted. In the controller 36, designation of the type of the connected enlarger 14 and the channel number causes the file corresponding to these to be read from the floppy disk 22, and, based upon the data stored in this file, said shutter 104 and the dimmer filters 96, 98, 100 are controlled.

Figure 5:
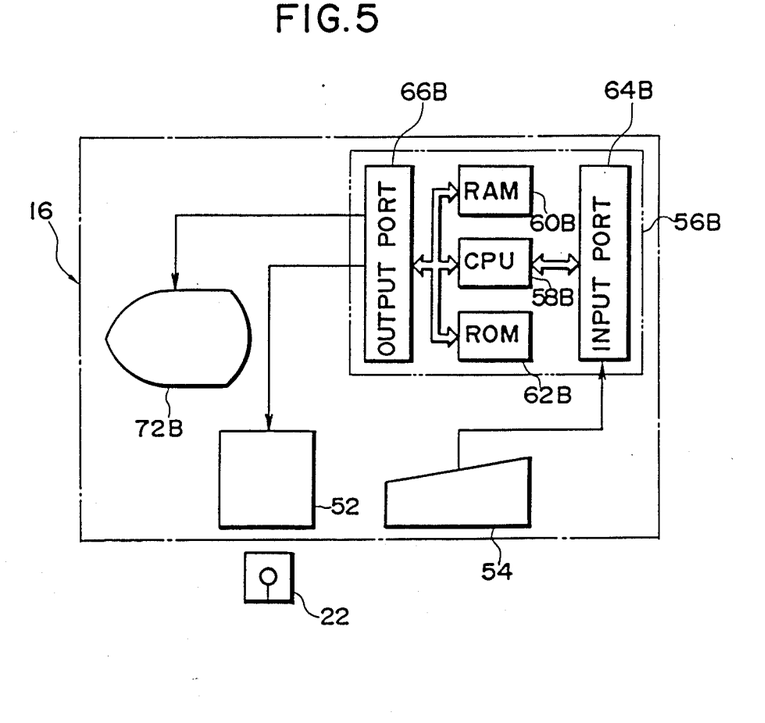
FIG. 5 is a block diagram of the tester thereof.

The finish quality of the printed sheet 50 is visually judged by the operator. This visual inspection must be performed because the desired color balance, density, etc. may not be obtained even when printing is conducted based upon the data corrected in said analyzer 12 (test print). If there is any difference between the color balance, density, etc. actually obtained and that desired, the data stored on the floppy disk 22 is rewritten by means of the tester shown in FIG. 5. Of the components of this tester 16, those that are identical with the components of the body 18 of the reception unit 10 shown in FIG. 5 are given the same referance number with a B at its end, and their explanation is omitted here.

On a liquid crystal display 72B is displayed the data of the designated file read from the floppy disk 22 inserted in a disk drive 52 of the tester 16, through key manipulation. the operator watches this display and specifies the data to be modified, and through input operation by key manipulation, he can rewrite the data. The floppy disk 22, the rewriting of which is over, is taken out of the disk drive 52 and inserted again in the disk drive 114 of the controller 36 so as to perform printing (final print).

The operation of this embodiment will now be explained.

After the photographing, the negative film used 20 is developed through the predetermined development process and loaded in the digitizer 26 of the reception unit 10. Then the floppy disk 22 is inserted in the disk drive 74 of the reception unit 10 to actuate the digitizer. In the digitizer 12, the image frame is adjusted to the coordinate axes and the range of the image (especailly of a person) to be printed is specified by manipulating the keyboard 70, size measurement being performed at the same time. The size measured is supplied to the built-in microcomputer 56 to be stored in the RAM 60 temporarily. Subsequently, the size of the frame to be applied is read from the inserted floppy disk, and based on the size of this frame and that of said person, an optimum magnification can be calculated. The frame sizes being predetermined, they may be stored in a codified form. the magnification calculated is stored on the floppy disk 22 again. Here, the order number and the image frame number of the negative film 20 are input by manipulating the keyboard 70 and stored on the floppy disk 22 together with said magnification. When the above processes are over, the floppy disk 22 is taken out of the disk drive 74 and loaded in the disk drive 88 of the analyzer 12.

FIGS. 6 to 9 are flowcharts illustrating the control effected by the analyzer 12. The following explanation will be given with reference to these flowcharts.

Figure 6:
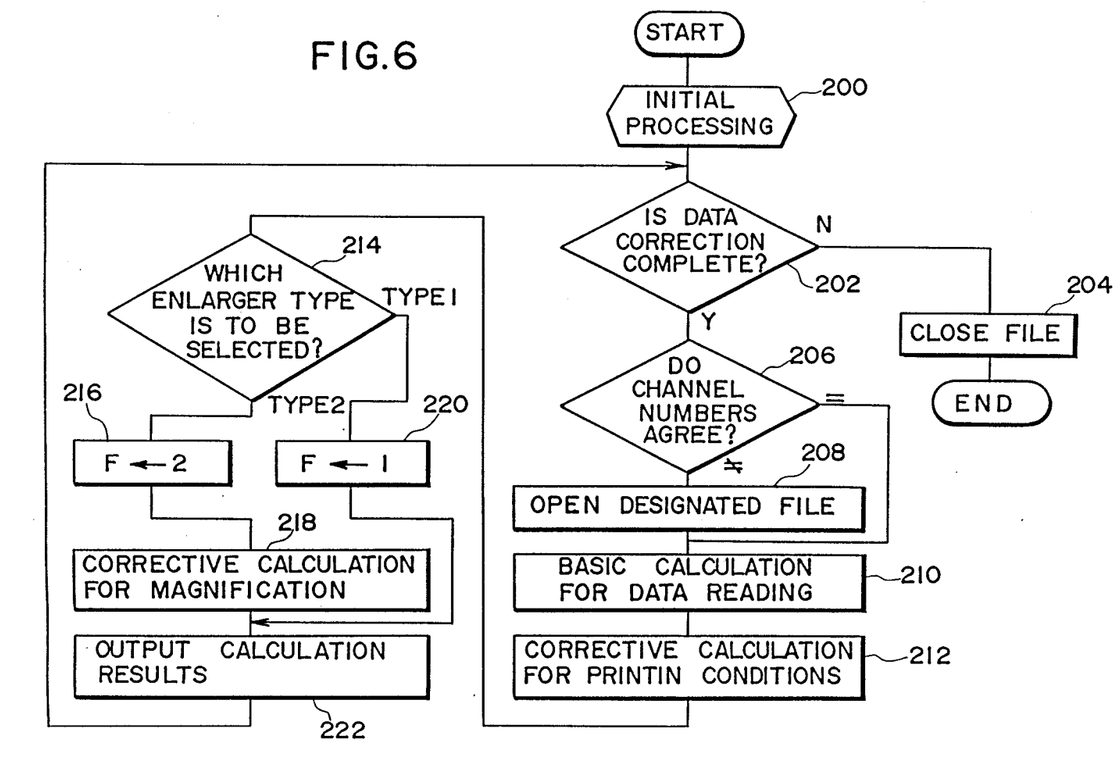
FIG. 6 is a flowchart of the main control at the analyzer.

FIG. 6 shows the main routine. First, the initial process is conducted at Step 200. In this initial process, the original file is opened, or flags or the like employed during the process are cleared. When the initial process at Step 20 is over, one proceeds to Step 202 where the data of the files open at that time are checked to see whether all the data correction operations (correction of the enlarger type and each channel number) have been done or not. When the data correction of all the files are complete at Step 202, one moves on to Step 204 and closes the file, which ends the process.

If it is judged at Step 202 that the file needs correcting, one proceeds to Step 206 to see whether the channel number stored in the file which is open at that time agrees with the channel number of the enlarger 14 which has been designated by manipulating the keyboard 90. If they do not agree with each other, one proceeds to Step 208 and closes the file which is open at that time, then proceeds to Step 210. If they agree with each other at Step 206, one proceeds to Step 210, skipping over Step 208.

At Step 210, the data necessary for printing is read out of the file which is open, and the values of the DSL, CBL, and CSL are calculated therefrom. After that, one proceeds to Step 212 and calculates the exposure time, color filter value and correction. The calculation procedure at Steps 210 and 212 will be discussed later.

At the next step, i.e., Step 214, the type of the enlarger 14 connected is selected. When Type 2 is selected, corrective calculation for magnification is judged to be necessary, and one moves to Step 216. After the condition F=2 is attained, one proceeds to Step 218 and performs corrective calculation for magnificatin, then proceeds to Step 222. The procedure of this corrective calculation for magnification will be discussed later.

When Type 1 of the enlarger 14 is selected at Step 214, there is no need for corrective calculation for magnification, so that one proceeds to Step 220, and, after attaining the condition F=1, proceeds to Step 222, skipping over Step 218. At Step 222, the calculation results are output to a dot printer.

Figure 7:
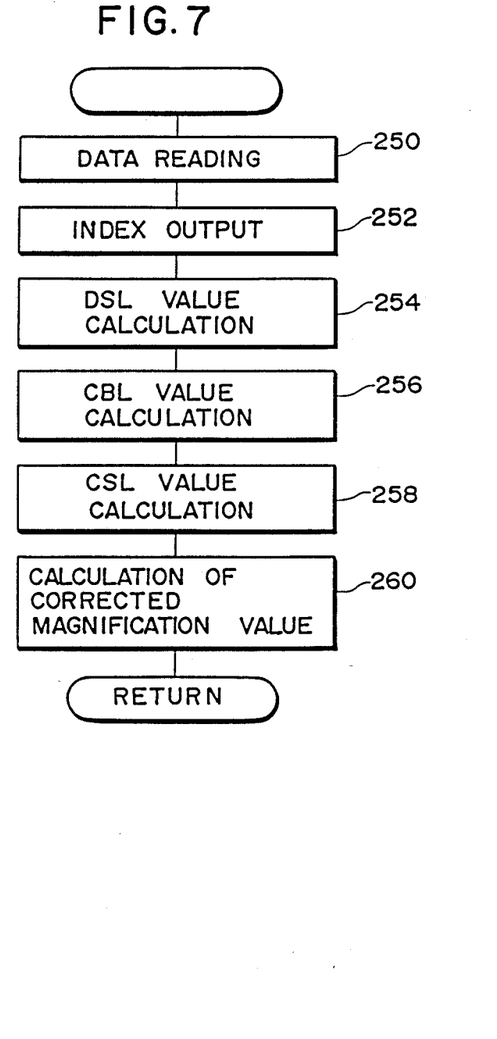
FIGS. 7 to 9 are subroutines for the data calculation at the analyzer.

When the data necessary for printing is read at Step 250, the index corresponding to the type of the enlarger 14 is first output to the dot printer at Step 252. In doing so, the value of F is determined at said Step 216 or Step 220, so that output is effected in accordance with this value. At Step 254, the DSL value is calculated using the following formulas:

$$DSLO = \frac{\left(\log_{10}\frac{PRTO}{PRTN}\right) \times 100}{FVDO - FVDN} \quad (1)$$

$$DSLU = \frac{\left(\log_{10}\frac{PRTO}{PRTN}\right) \times 100}{FVDU - FVDO} \quad (2)$$

where
DSLO: the slope value on the OVER side;
DSLU: the slope value on the UNDER side;
PRT (O, N, U): the print value of the printing condition file (the value adopted at the enlarger 14); and
FVD (O, N, U): the FVAC value of the printing condition file (the value adopted at the analyzer 12).

At the next step, Step 256, the CBL value is calculated using the following formulas:

$$CBLC = FVCN - PRCN \quad (3)$$

$$CBLM = FVMN - PRMN \quad (4)$$

$$CBLY = FVYN - PRYN \quad (5)$$

where
- CBLC: the CBL value of cyan;
- CBLM: the CBL value of magenta;
- CBLY: the CBL value of yellow;
- PR (C, M, Y) N: the print value of the printing conditions; and
- FV (C, M, Y) N: the FVCA value of the printing conditions.

Further, at the next step, Step 258, the CSL value is calculated using the following formulas. The CSL value is calculated for the OVER and UNDER sides, separately.

(CSL value on the OVER side)

$$CSLCO = (PRCO - PRCN) - (FVCO - FVCN) \quad (6)$$

$$CSLMO = (PRMO - PRMN) - (FVMO - FVMN) \quad (7)$$

$$CSLYO = (PRYO - PRYN) - (FVYO - FVYN) \quad (8)$$

(CSL value on the UNDER side)

$$CSLCU = (PRCU - PRCN) - (FVCU - FVCN) \quad (9)$$

$$CSLMU = (PRMU - PRMN) - (FVMU - FVMN) \quad (10)$$

$$CSLYU = (PRYU - PRYN) - (FVYU - FVYN) \quad (11)$$

where
- CSL (C, M, Y) O: the color slope on the OVER side;
- CSL (C, M, Y) U: the color slope on the UNDER side;
- PR (C, M, Y) (O, N, U): the print value of the print condition file; and
- FV (C, M, Y) (O, N, U): the FVCA value of the printing conditions.

Subsequently, the correction value of magnification is calculated at Step 260. Here, when the enlarger 14 selected is Type 1, there is no need for such a calculation, so that one returns to the main routine.

When the correction needs performing, first the distance BH between the lens 42 at the home magnification and the printing paper sheet 50 set on the easel 48 is calculated using the following formula:

$$BH = FOCUL\,(HMAG + 1) \quad (12)$$

Subsequently, the correction values of magnification (T, C, M, Y) MAGH are calculated.

$$TMAGH = \frac{MAGT2 - PRTN}{PRTN\left(\frac{(2HMAG + 1)}{(HMAG + 1)}\right)^2 - PRTN} \quad (13)$$

$$CMAGH = MAGC2 - PRCN \quad (14)$$

$$MMAGH = MAGC2 - PRMN \quad (15)$$

$$YMAGH = MAGC2 - PRYN \quad (16)$$

where
- MAG (T, C, M, Y) 2: the print value which is double the value of the printing condition file;
- PR (T, C, M, Y) N: the print value of the printing condition file;
- FOCUL: the lens focal distance of the printing condition file; and
- HMAG: the home magnification of the printing condition file.

When the above calculations have been finished, one returns to the main routine.

Figure 8:
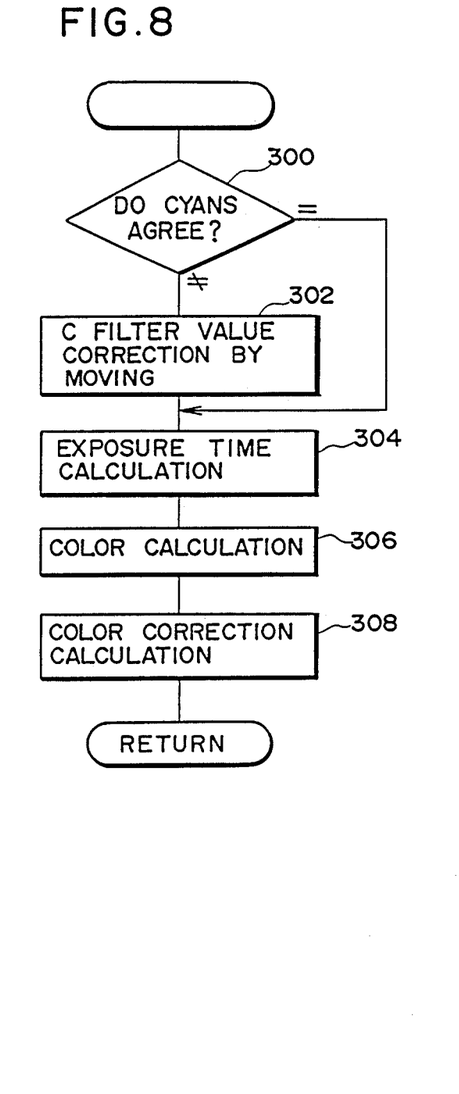

Next, the subroutine at Step 212 will be explained with reference to FIG. 8.

First, it is examined at Step 300 whether the cyan of the image displayed (projected) on the CRT 32 of the analyzer 12 is identical with that of the designated file data. If the judgement is negative, one proceeds to Step 302 to effect correction so that they may agree with each other, and then moves on to Step 304. If the judgement at Step 300 is affirmative, one proceeds to Step 304, skipping over Step 302. At Step 304, the exposure time is calculated using the following formula.

$$Tx = (FVD - FVDN) \quad (17)$$

where
- Tx: the mean value when the exposure time is calculated;
- FVD: the density value at the analyzer; and
- FVDN: the FVCA value under the printing condition file.

Here, when TX<0, correction is effected using the following formula (18), and when Tx>0, the following formula (19):

$$T_x = T_x \times DSLU/100 \quad (18)$$

$$T_x = T_x \times DSLO/100 \quad (19)$$

Next, the exposure time $PRT_x$ is calculated using the following formula:

$$PRT_x = PRTN \times 10^{TX} \quad (20)$$

where PRTN: the print value of the printing condition file.

At the next step, Step 306, the color calculation is performed. In this color calculation, the color balance and the color slope are to be calculated.

The color balance calculation is performed using the following formulas:

$$FVCX = FVC - CBLC \quad (21)$$

$$FVMX = FVM - CBLM \quad (22)$$

$$FVYX = FVY - CBLY \quad (23)$$

where FV (CX, MX, YX): the color valance value.

Next, the calculation of the color slope (PR (C, M, Y)) is performed using the following formulas. The calculation procedure is different depending on the $T_x$ value obtained from the above formula (17).

(When $T_x < 0$)

$$PRC = T_1 \times CSLCU + FVCX \quad (24)$$

$$PRM = T_1 \times CSLMU + FVMX \quad (25)$$

$$PRY + T_1 \times CSLMU + FVYX \quad (26)$$

where $T_1 = (FVDN - FVD)/(FVDN - FVDU) \quad (27)$ (When $T_x = 0$)

$$PRC = FVCX \quad (28)$$

$$PRM = FVMX \quad (29)$$

$$PRY = FVYX \quad (30)$$

-continued (When $T_x > 0$)

$$PRC = T_2 \times CSLCO + FVCX \quad (31)$$

$$PRM = T_2 \times CSLMO + FVMX \quad (32)$$

$$PRY = T_2 \times CSLYO + FVYX \quad (33)$$

where $T_2 = (FVDN - FVDX)/(FVDN - FVDO)$ (34)

At the next step, Step 308, the color correction is calculated. First, the color center ((C, M, Y) N) is calculated using the following formulas:

(When $T_x < 0$)

$$CN = PRCN - (PRCN - PRCU) \times T_2 \quad (35)$$

$$MN = PRMN - (PRMN - PRMU) \times T_2 \quad (36)$$

$$YN = PRYN - (PRYN - PRYU) \times T_2 \quad (37)$$

(When $T_x = 0$)

$$CN = PRCN \quad (38)$$

$$MN = PRMN \quad (39)$$

$$YN = PRYN \quad (40)$$

(When $T_x > 0$)

$$CN = PRCN - (PRCN - PRCO) \times T_2 \quad (41)$$

$$MN = PRMN - (PRMN - PRMO) \times T_2 \quad (42)$$

$$YN = PRYN - (PRYN - PRYO) \times T_2 \quad (43)$$

Subsequently, the correction (PR (C, M, Y) X) is calculated using the following formulas:

When $CN - PRC > 0$, $$PRCX = CN - (CN - PRC) \times CORR/100 \quad (44)$$

When $CN - PRC < 0$, $$PRCX = CN - (CN - PRC) \times CORC/100 \quad (45)$$

When $MN - PRM > 0$, $$PRMX = MN - (MN - PRM) \times CORG/100 \quad (46)$$

When $MN - PRM < 0$, $$PRMX = MN - (MN - PRM) \times CORM/100 \quad (47)$$

When $YN - PRY > 0$, $$PRYX = YN - (YN - PRY) \times CORB/100 \quad (48)$$

When $YN - PRY < 0$, $$PRYX = YN - (YN - PRY) \times CORY/100 \quad (49)$$

When the above calculations have been finished, one returns to the main routine.

Figure 9:
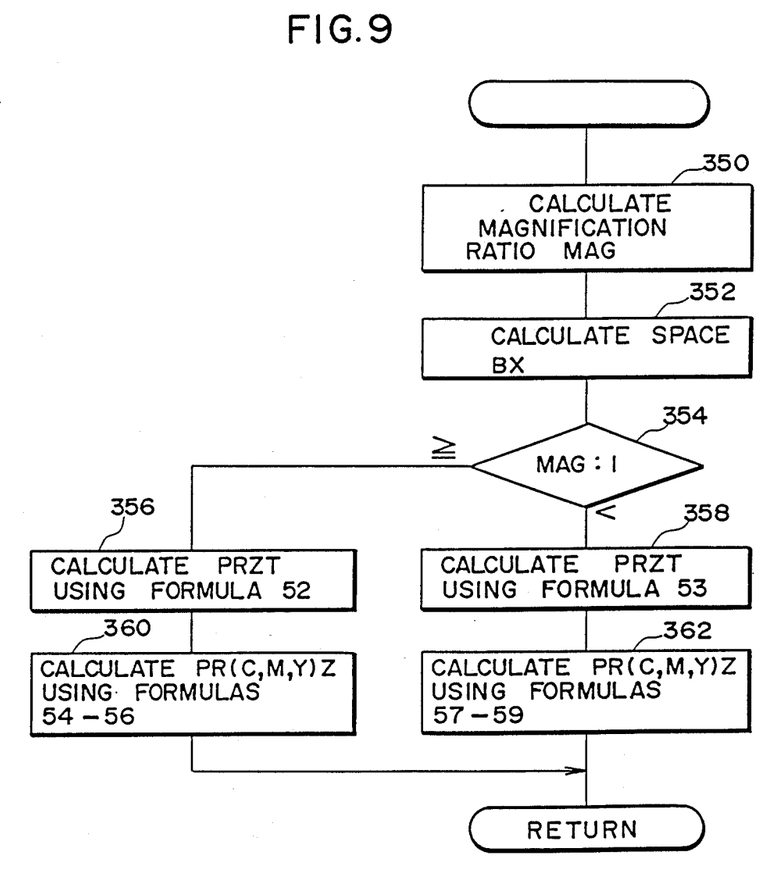

The corrective calculation of the data in terms of magnification, which is performed at Step 218, will now be explained with reference to the flowchart shown in FIG. 9.

First, the magnification ratio MAG is calculated at Step 350 using the following formula:

$$MAG = FMAG/HMAG \quad (50)$$

where
FMAG: the magnification which has been input at FVCA; and
HMAG: the home magnification of the printing condition file.

Then, at Step 352, the distance BX between the enlarger lens 42 and the printing paper sheet 50 set on the easel 48 is calculated using the following formula:

$$BX = FOCUL (FMAG + 1) \quad (51)$$

where FOCUL: the lens focal distance of the printing condition file.

Next, the corrective calculation for the exposure time is performed. Here, at Step 354, the magnification ratio MAG obtained from the above formula (50) is compared with 1, and when the magnification ratio MAG is 1 or more (MAG ≧ 1), the home magnification is relatively high, so that one proceeds to Step 356 and calculates the exposure time PRTZ using the following formula:

$$PRTZ = PRT \times (1 + (BX/BH)^2 - 1) \times TMAGH \quad (52)$$

When the magnification ratio obtained from the above formula (50) is less than 1 (MAG < 1), it indicates a relatively low home magnification, so that one proceeds to Step 358 and calculates the exposure time PRTZ using the following formula:

$$PRTZ = PRT \times \left( \cfrac{1}{1 + \left( \cfrac{1}{\left(\frac{BX}{BH}\right)^2} - 1 \right) \times TMAGH} \right) \quad (53)$$

Subsequently, correction of the color calculation value PR (C, M, Y) Z is performed. Also in this correction procedure, different formulas are used according to whether the home magnification is relatively high (Step 360) or relatively low (Step 362).

(When $MAG \geq 1$)

$$PRCZ = PRCX + CMAGH/A (MAG - 1) \quad (54)$$

$$PRMZ = PRMX + MMAGH/A (MAG - 1) \quad (55)$$

$$PRYZ = PRYX + YMAGH/A (MAG - 1) \quad (56)$$

(When $MAG < 1$)

$$PRCZ = PRCX + CMAGH/A (1/MAG - 1) \quad (57)$$

$$PRMZ = PRMX + MMAGH/A (1/MAG - 1) \quad (58)$$

$$PRYZ = PRYX + YMAGH/A (1/MAG - 1) \quad (59)$$

where A: the value obtained by subtracting 1 from double the magnification.

The above calculations finished, one returns to the main routine.

Here, the calculation values obtained are all stored on the floppy disk 22, which is inserted in the disk drive 38 of the controller 36 provided in the enlarger 14.

In the enlarger 14, the data stored on the floppy disk 22 are read, and based on this, the movable section 44 is set in a predetermined position. Then, the shutter 104 and the dimmer filters 96, 98, 100 are controlled through the respective drivers 106, 108, 110, 112 to conduct printing.

The printing over, the sheet 50 is developed through a predetermined development process, then inspected visually by the operator. When the printed sheet proves to be inadequate by this inspection, reprinting must be conducted, which requires rewriting of the data stored on the floppy disk.

To perform this rewriting operation, the operator takes out the floppy disk from the disk drive 114 of the controller 36 and inserts it in the disk drive 52 of the tester 16, where the data to be rewritten is read into the CPU 58B and displayed on the liquid crystal display 72B. Watching this display, the operator can rewrite the data through key manipulation. The data rewritten is then stored on the floppy disk 22 again, which completes the rewriting operation.

Here, this floppy disk 22 is taken out from the disk drive 52 and inserted in the disk drive of the controller 36 provided in the enlarger 14, thus enabling the reprinting to be performed, based upon the data rewritten. In this way, data can be rewritten any time, enabling test printing, so that the same finish can be obtained if a plurality of sheets are printed as final printing.

Further, data stored on the floppy disk 22 can be easily changed by inserting the floppy disk 22 in the tester 16 and reading out the designated file, so that the operator can visually perform a fine finish adjustment through test printing, whereby an optimum finish is assured for the final printing.

While in this embodiment a floppy disk is employed as the storage medium, other mediums such as an optical disk or a paper tape may also be employed. Further, while the enlarger of this embodiment is of the subtractive color type, it may be of the additive color type using R (red), G (green) and B (blue) or of the free focus type.

What is claimed is:

1. A photographic printing system, comprising an analyzer adapted to store on a storage medium printing condition data based upon image information obtained from a negative film and, an enlarger adapted to perform printing based upon the data stored on said storage medium, said analyzer storing said printing condition data on said storage medium after correcting them in accordance with at least one of information regarding the specifications of said enlarger and channels of a negative film and a printing paper.

2. A photographic printing system as claimed in claim 1, wherein said enlarger is selected from a plurality of enlargers which have identification serial numbers, and said channel comprises a type of negative film, a name of a maker of said negative film, sensitivity of said negative film and emulsion number of a printing paper, and said analyzer corrects said printing condition data on the basis of at least one of information on the type of exposure system of said enlarger, the identification serial numbers of said enlargers, and said channels, and stores said corrected printing condition data on said storage medium.

3. A photographic printing system as claimed in claim 1, further comprising a reception unit having a function of calculating enlargement magnifications in accordance with the dimensions of the range required by the image on the negative film as well as those of the finished print.

4. A photographic printing system as claimed in claim 1, further comprising a tester having a function of modifying the printing condition data stored on said storage medium.

5. A photographic printing system as claimed in claim 3, further comprising a tester having a function of modifying the printing condition data stored on said storage medium.

6. A photographic printing system as claimed in claim 1, wherein said printing condition data include at least one of the following: the density slope value, the color balance value, the color slope value, the exposure time and the enlargement magnification.

7. A photographic printing system, comprising:
a storage medium for storing printing condition data to be used in a plurality of enlargers in a state adapted for each of the enlargers;
an analyzer for transducing a negative image stored on a negative film into a positive one and displaying this on a CRT as well as for transducing the data thus displayed on the CRT into the printing condition data to be used in each of the enlargers and storing them on said storage medium so that an optimum image corresponding to the positive image displayed on CRT may be printed using each of the enlargers; and
a plurality of enlargers each of which is adapted to select the suited printing conditions from among a plurality of printing conditions stored on said storage medium and performs printing based upon the printing condition data thus selected.

8. A photographic printing system as claimed in claim 7, further comprising a reception unit which is provided with a digitizer for inputting the necessary range of the image on the negative film and an input means for inputting the dimensions of the finished print and which is adapted to calculate the enlargement magnification based upon the input data and store the result on said storage medium as one of the printing condition data.

9. A photographic printing system as claimed in claim 7, further comprising, a tester provided with a function of modifying printing condition data and utilized for the purpose of modifying the printing condition data based upon the results obtained from the inspection of the image printed by said enlargers.

10. A photographic printing system as claimed in claim 8, further comprising, a tester provided with a function of modifying printing condition data and utilized for the purpose of modifying the printing condition data based upon the results obtained from the inspection of the image printed by said enlargers.

11. A photographic printing system as claimed in claim 7, wherein said printing condition data include at least one of the following: the density slope value, the color balance value, the color slope value, the exposure time and the enlargement magnification.

12. A photographic printing system as claimed in claim 7, wherein said storage medium stores the printing condition data for each of the enlargers distinguished from each other in either or both of the exposure system type and the machine number.

13. A photographic printing system as claimed in claim 7, wherein said storage medium stores the printing condition data for each of the enlargers distinguished from each other in either or both of the exposure system type and the machine number as well as for each channel of said enlargers.

14. A photographic printing system as claimed in claim 13, wherein each of said plurality of enlargers selects printing condition data corresponding to the channel used from among a plurality of printing condition data stored on said storage medium and performs printing based upon the printing condition data thus selected.

15. A photographic printing system, comprising:
a storage medium for storing printing condition data to be used in an enlarger in a state adapted to the enlarger channel;
an analyzer which is adapted to transduce a negative image stored on a negative film into a positive one and display it on a CRT and which is also adapted to transduce the data displayed on the CRT into the printing condition data to be used for each channel and store them on said storage medium in a state adapted to each channel so that an optimum image corresponding to the positive image displayed on the CRT may be printed using each channel of the enlarger; and
an enlarger adapted to select the printing condition data corresponding to the channel to be used from among a plurality of printing condition data stored in said storage medium and to perform printing based upon the printing condition data thus selected.

16. A photographic printing system as claimed in claim 15, further comprising a reception unit which is provided with a digitizer for inputting the necessary range of the image on the negative film and an input means for inputting the dimensions of the finished print and which is adapted to calculate the enlargement magnification based upon the input data and store the result on said storage medium as one of the printing condition data.

17. A photographic printing system as claimed in claim 15, further comprising, a tester provided with a function of modifying printing condition data and utilized for the purpose of modifying the printing condition data based upon the results obtained from the inspection of the image printed by said enlargers.

18. A photographic printing system as claimed in claim 16, further comprising, a tester provided with a function of modifying printing condition data and utilized for the purpose of modifying the printing condition data based upon the results obtained from the inspection of the image printed by said enlargers.

19. A photographic printing system as claimed in claim 15, wherein said printing condition data include at least one of the following: the density slope value, the color balance value, the color slope value, the exposure time and the enlargement magnification.

20. A photographic printing system as claimed in claim 7, wherein said enlargers are of the free focus type.

* * * * *